(12) United States Patent
Greenwood et al.

(10) Patent No.: US 10,110,027 B2
(45) Date of Patent: Oct. 23, 2018

(54) BATTERY SAFETY SYSTEM

(71) Applicant: JAGUAR LAND ROVER LIMITED, Warwickshire (GB)

(72) Inventors: Jeremy Greenwood, Coventry (GB); Chris Clarke, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 417 days.

(21) Appl. No.: 14/386,605

(22) PCT Filed: Mar. 21, 2013

(86) PCT No.: PCT/EP2013/055999
§ 371 (c)(1),
(2) Date: Sep. 19, 2014

(87) PCT Pub. No.: WO2013/139943
PCT Pub. Date: Sep. 26, 2013

(65) Prior Publication Data
US 2015/0051771 A1    Feb. 19, 2015

(30) Foreign Application Priority Data
Mar. 22, 2012   (GB) ..................... 1205039

(51) Int. Cl.
*G01R 31/36*   (2006.01)
*B60L 11/00*   (2006.01)
(Continued)

(52) U.S. Cl.
CPC .............. *H02J 7/0029* (2013.01); *B60L 3/04* (2013.01); *B60L 11/1861* (2013.01)

(58) Field of Classification Search
None
See application file for complete search history.

(56) References Cited

U.S. PATENT DOCUMENTS

2010/0026242 A1   2/2010  Forslow
2010/0079116 A1   4/2010  Thivierge et al.
(Continued)

FOREIGN PATENT DOCUMENTS

DE   102010008203 A1   8/2011
EP       2133974 A1    12/2009
(Continued)

OTHER PUBLICATIONS

PCT International Search Report for International Application No. PCT/EP2013/055999 dated Dec. 6, 2013.
(Continued)

*Primary Examiner* — Adam D Tissot

(57) ABSTRACT

A system for discharging the electric charge stored in a traction battery of an electric vehicle or hybrid electric vehicle. The system comprising a traction battery having a plurality cells, a battery management system for balancing or regulating the electric charge stored in each of the battery cells. A sensor for detecting a vehicle event is provided on the vehicle. The battery management system, upon receiving a signal indicative that a vehicle event has occurred, initiates a discharge cycle of the electrical energy stored in one or more of the cells of the battery via an energy dissipation device such as a battery regulator or battery balancer.

21 Claims, 2 Drawing Sheets

(51) Int. Cl.
*H02J 7/00* (2006.01)
*B60L 3/04* (2006.01)
*B60L 11/18* (2006.01)

(56) References Cited

U.S. PATENT DOCUMENTS

2012/0063044 A1 3/2012 Fukuyama et al.
2012/0313560 A1* 12/2012 Hambitzer ........ H01M 10/4207
318/139

FOREIGN PATENT DOCUMENTS

| | | |
|---|---|---|
| GB | 2265240 A | 9/1993 |
| JP | 2001145202 A | 5/2001 |
| JP | 2004129367 A | 4/2004 |
| JP | 2007221914 A | 8/2007 |
| JP | 2010182579 A | 8/2010 |
| WO | 2009106394 A1 | 9/2009 |
| WO | 2011028160 A1 | 3/2011 |
| WO | 2011/042807 A1 | 4/2011 |

OTHER PUBLICATIONS

Combined Search and Examination Report under Section 17 and 18(3) for Application No. GB1205039.9 dated Jul. 16, 2012.

* cited by examiner

BATTERY SAFETY SYSTEM

TECHNICAL FIELD

The present invention relates to a battery safety system and a method of discharging a battery and particularly, but not exclusively, to a battery safety system for discharging the battery when battery integrity may have been compromised. Aspects of the invention relate to a system, to a vehicle and to a method.

BACKGROUND

It is known to provide battery systems in electric vehicles and hybrid electric vehicles for providing power to an electric drive motor to propel the vehicle. Such batteries typically operate at voltages of around 300-400 volts and are capable of delivering direct current, at least temporally, at levels of 1000 amperes.

It may be desirable in certain circumstances, for example following a vehicle collision, to provide a battery safety system in which discharge of the battery can be triggered either automatically or manually.

It is against this background that the present invention has been conceived. Embodiments of the invention may provide an improvement in the field of battery systems that has particular application for vehicles. The invention may be utilised in applications other than for vehicles. Other aims and advantages of the invention will become apparent from the following description, claims and drawings.

SUMMARY

Aspects of the invention provide a system, a vehicle and a method as claimed in the appended claims.

According to one aspect of the invention for which protection is sought, there is provided a method of discharging a vehicle battery comprising;
 detecting a vehicle event via one or more sensors, and in response; discharging one or more cells of the vehicle battery utilising a battery management system until an electrical characteristic of the battery attains a predefined threshold value, wherein the battery management system is arranged to control the discharge of a first group of cells independently of at least a second group of cells.

Optionally the battery management system is adapted to control a plurality of switches to selectively discharge the first group of cells independently of the at least second group of cells.

Optionally the electrical characteristic is one of the following;
 electrical charge stored in or by said one or more cells, or voltage or potential difference across the battery.

In some embodiments the method comprises prioritising discharge of one or more cells based upon predefined criteria.

Optionally, the predefined criteria is one or more of the following:
 physical location of the one or more cells within the housing of the battery, detection of damage to the one more cells, or vehicle design.

In embodiments of the invention the method comprises isolating the battery terminals from the battery cells.

Optionally the discharge of the one or more cells is controlled to prevent the temperature of the battery reaching a threshold level.

According to another aspect of the invention for which protection is sought, there is provided a method of discharging a battery of a vehicle, the battery having a plurality of cells each adapted to store a charge, the method comprising;
 detecting a vehicle event via one or more sensors, and in response;
 discharging the battery utilising a battery management system until an electrical characteristic of the battery attains a predefined threshold value,
 wherein the battery management system is adapted to control the discharge of a first one or more of the plurality of cells independently of at least a second one or more of the plurality of cells, wherein the first group of the plurality of cells comprises one or more cells.

According to another aspect of the invention for which protection is sought, there is provided a system for discharging electric charge of a battery having a plurality of cells, the system comprising, a battery management system for balancing the electric charge of each of the cells, and a sensor for detecting a vehicle event, wherein the battery management system, upon receiving a signal indicative that a vehicle event has occurred, is configured to initiate a discharge cycle of the electrical energy stored in one or more of the cells of the battery via one or more energy dissipation devices, wherein the battery management system is adapted to control the discharge of a first group of the plurality of cells independently of at least a second group of the plurality of cells.

Optionally, the energy dissipation device is a passive battery regulator or an active battery balancer. Advantageously, therefore, the energy dissipation device is a component part of the battery that is used during normal operation of the battery. This means that there is no need to store an additional discharge means. Thus there are direct cost benefits.

In some embodiments the battery is a traction battery for providing power to an electrically powered drive motor for vehicle propulsion.

Optionally, the vehicle event is a crash and the sensor is a crash sensor for measuring deceleration of the vehicle or detecting a collision impact.

Optionally, the vehicle event is a flooding of the vehicle and the sensor is a water sensor for detecting the presence of water in unsuitable locations.

Optionally, the vehicle event is a servicing of the vehicle and the sensor is a switch operable during servicing.

Aspects of the invention may provide non-rapid discharge times. This is achieved by balancing the electric charge of groups of the cells so as to lower the stored charge gradually. This is advantageous in crash situations where rapid discharge of the battery may not be preferable.

The system may comprise an isolator for electrically disconnecting the battery terminals from the plurality of cells.

According to yet another aspect of the invention for which protection is sought, there is provided a vehicle comprising the system described in the relevant preceding paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Detailed descriptions of specific embodiments of the battery system and method of discharging a battery of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the battery system and method of discharging a battery described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
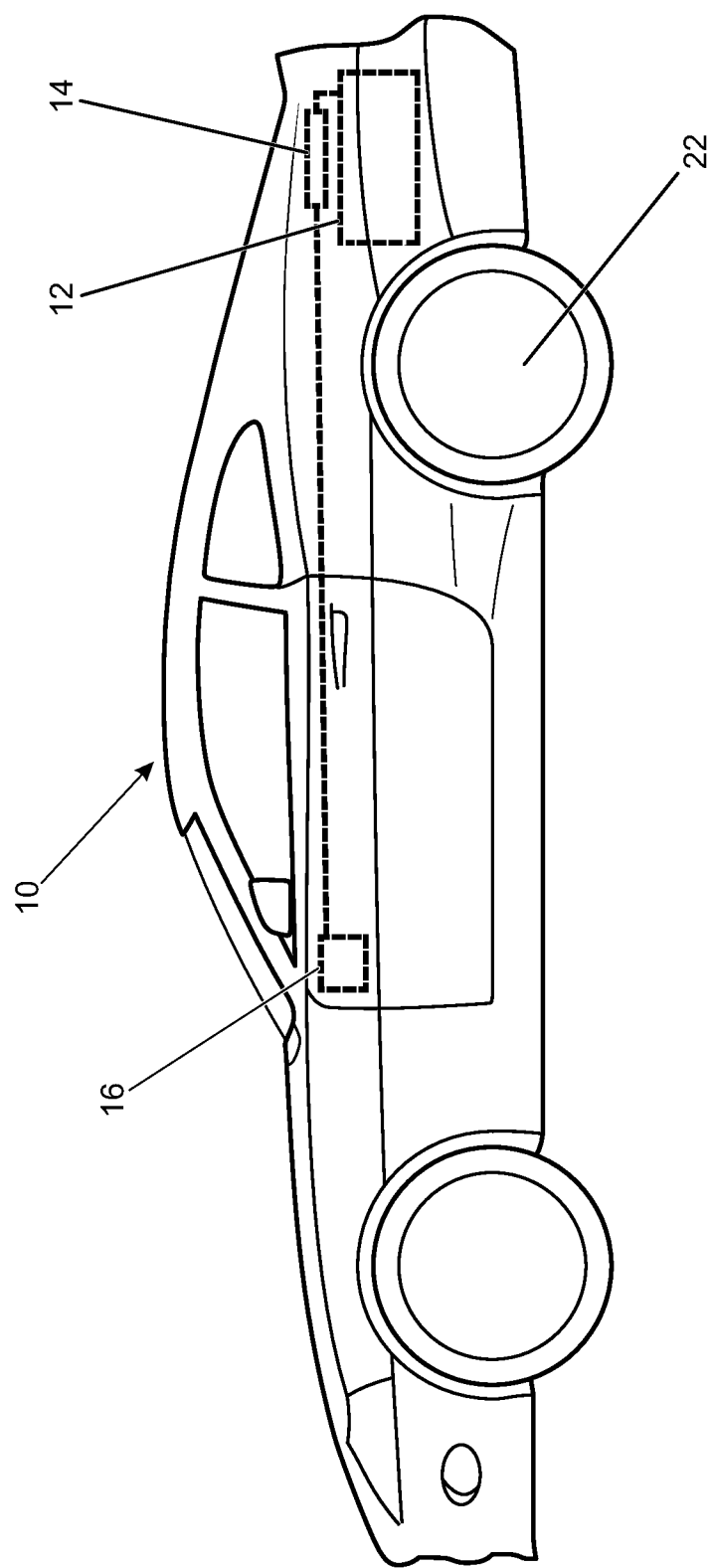
FIG. 1 is a side view of a vehicle according to an embodiment of the invention.

FIG. 1 illustrates a vehicle 10 according to an embodiment of the invention; the vehicle 10 comprises a battery 12. The battery 12 is optionally a traction battery for providing power to a drive motor (not shown) for propulsion of the vehicle 10. In some embodiments the vehicle 10 may also comprise additional drive means (not shown) such as an internal combustion engine.

A control unit 14 is coupled to the battery 12 and to a sensor 16, or more particularly a vehicle event sensor 16. In the illustrated embodiment the sensor 16 is a crash sensor, the crash sensor 16 forms part of a passenger air bag safety system (not shown).

The crash sensor 16 may be electromechanical or electronic, such as a piezoelectric accelerometer. Optionally, the crash sensor 16 may also be configured to activate a passenger airbag (not shown) within the vehicle 10 in response to the vehicle experiencing sufficient deceleration in a crash event.

In alternative embodiments, the sensor 16 may be a water sensor suitable for detecting a flood event of the vehicle. It should be appreciated that a flood event which renders the vehicle 10 unusable might also require immediate shutdown of the vehicle. In such a scenario, the sensor may be configured to activate vehicle shutdown.

In alternative embodiments, the sensor 16 may be a switch operable by a servicing engineer during servicing of the vehicle.

In alternative embodiments the control unit 14 may be coupled indirectly to the sensor 16 optionally for example via one or more intermediate controllers. For example, in the embodiment where the sensor 16 is a crash sensor, the intermediate controller may be a passenger airbag controller (not shown). Information from the sensor 16 may be transmitted via an associated controller via a vehicle CAN-bus or other suitable vehicle based data network. In yet further embodiments the sensor 16 is dedicated to the battery safety system and may be integrated into the packaging of battery 12.

Figure 2:
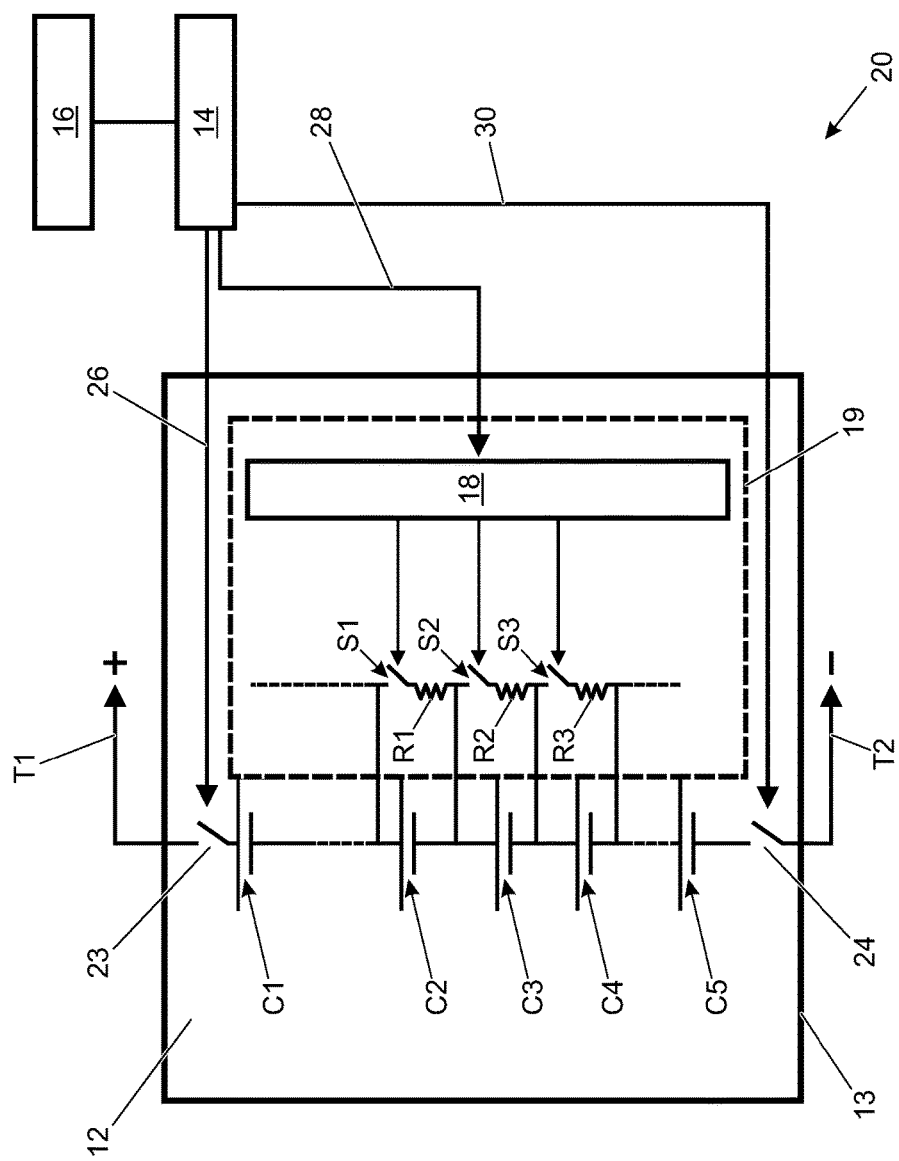
FIG. 2 is a schematic illustration of a battery system according to an embodiment of the invention.

FIG. 2 illustrates a system 20 for use in the vehicle 10; system 20 comprises the battery 12, control unit 14 and sensor 16.

Battery 12 comprises a housing 13 having a first, positive terminal T1 and a second, negative terminal T2. The first and second terminals T1, T2 are coupled via leads to an electric motor (not shown) which provides rotation to the drive wheels 22 of the vehicle 10 (shown in FIG. 1). Battery 12 comprises a plurality of cells C1, C2, C3, C4, C5, for storing electrical charge.

The battery 12 comprises a pair of switches or contactors 23, 24. Contactor 23 is located electrically proximate terminal T1 and contactor 24 is located electrically proximate terminal T2; such that the cells C1, C2, C3, C4, C5 of the battery 12 can be electrically disconnected. The contactors 23, 24 can be employed to isolate the battery 12 from the vehicle 10 when not in use or in an emergency such as a following a vehicle event so as to protect vehicles passengers and emergency service personnel during rescue operations. Vehicle events may be, for example, a crash or a flood of the vehicle. Similarly, during servicing, the contactors may be employed to isolate the battery and thus protect service personnel. Therefore a vehicle event may also be servicing of the vehicle.

It is envisaged that the switches 23, 24 are coupled to control unit 14, by respective connections 26, 30 such that upon detection of a vehicle event by the sensor 16, the switches 23, 24 are configured to adopt an open position, thus electrically disconnecting the cells C1, C2, C3, C4, C5 from the first and second terminals T1, T2.

A balancing controller 18 is coupled by connector 28 to control unit 14, such that upon detection of a vehicle event by sensor 16 the balancing controller instructs the switches S1, S2, S3 to close, whereby discharging each cell C2, C3, C4 by dissipating electric charge as heat across the respective resistors R1, R2, R3. It should therefore be noted that the resistors are energy dissipation devices.

The battery 12 comprises a battery management system 19 comprising a battery balancer for active balancing of the cells C1, C2, C3, C4, C5 or a battery regulator for passively controlling the state of charge of the cells C1, C2, C3, C4, C5. In the illustrated embodiment of FIG. 2 a battery regulator is shown. Each of the passive battery regulator and the active battery balancer are energy dissipation devices. The battery balancer and/or regulator are components of the battery that are utilised during its normal operation, i.e. before the battery is discharged. Therefore, embodiments of the system do not require additional, separate, discharge means, which may be expensive. Furthermore, there exists a risk that during a vehicle event such as a crash, a communication pathway between a battery and separate discharge means may be interrupted and thus inhibit discharge of the battery. Combination of the battery with the discharge means, as permitted by embodiments of the present invention, therefore mitigates that risk.

The battery management system 19 of FIG. 2 comprises a passive battery regulator including a resistor R1, R2, R3 connected across a respective cell C1, C2, C3, C4, C5. In the illustrated embodiment resistor R1 is connected across cell C2; resistor R2 is connected across cell C3; and resistor R3 is connected across cell C4. A resistor (not shown) is connected across each of cells C1 and C5.

A switch S1 is connected in series with resistor R1 across cell C2. A switch S2 is connected in series with resistor R2 across cell C3. A switch S3 is connected in series with resistor R3 across cell C4.

It is envisaged that switches S1, S2, S3 are transistors such as a metal oxide semiconductor field-effect transistor (MOSFET).

The battery management system 19 comprises a balancing controller 18 coupled to the switches S1, S2, S3. Balancing controller 18 is configured to balance or regulate the electric charge stored on each of the cells C1, C2, C3, C4, C5 within the battery 12.

By closing any one of switches S1, S2, S3 the respective cells C2, C3, C4 can dissipate electric charge stored therein. This is because closing the requisite switch S1, S2, S3 closes or completes the respective electrical circuit such that current flows through the respective register R1, R2, R3. The electrical energy or charge stored in the respective cell C1, C2, C3, C4, C5 is dissipated as heat within the resistor R1, R2, R3.

In the event of a vehicle event such as a crash or vehicle collision, a sudden deceleration of the vehicle 10 may result, which is detected by sensor 16. Alternatively, or in addition, the sensor 16 may be configured to detect other vehicle events such as a flood or a servicing or maintenance activity on the vehicle in which it is desirable for the battery to be discharged on disconnected. In each of these examples, the control unit 14 receives a signal from the sensor 16 in response to which the control unit 14 is configured to determine that a discharge cycle should be initiated on the battery 12. A signal is received by the balancing controller 18 from the control unit 14. The balancing controller 18 is configured to then instruct one or more of switches S1, S2, S3 to close. In some embodiments all of switches S1, S2, S3 are closed simultaneously. In other embodiments all switches S1, S2, S3 are closed in a predetermined sequential order. In yet further embodiments two or more switches S1, S2, S3 are simultaneously closed, followed sequentially by subsequent closing of remaining switches S1, S2, S3 as is further described below.

Thus the electrical charge stored in each of the cells C1, C2, C3, C4, C5 in respect of which switches S1, S2, S3 have been closed, is discharged. Thus the voltage or potential difference in each of the cells C1, C2, C3, C4, C5 is reduced and hence the voltage or potential difference of the battery 12 as a whole is reduced.

The balancing controller 18 may include a temperature sensor (not shown) to monitor the temperature of the battery 12 as the cells C1, C2, C3, C4, C5 are discharged. In some embodiments of the invention a plurality of temperature sensors may be provided; optionally one temperature sensor is provided for each cell C1, C2, C3, C4, C5. The balancing controller 18 may be configured to open one or more switches S1, S2, S3, thereby disconnecting the respective resistor R1, R2, R3 from the cell C2, C3, C4 and whereby at least temporarily suspending or terminating the flow of electrical current. In doing so the dissipation of electrical energy as heat in the resistor R1, R2, R3 ceases and heat can be transmitted to the surroundings by convection, conduction or radiation. Thus the temperature of the battery 12 is reduced. In some embodiments a fan or blower may be provided to control the temperature of the battery 12 during the discharge cycle.

In yet another embodiment the balancing controller 18 may close alternate switches, for example closing switches S1 and S3 whilst leaving switch S2 open. Cell C3 may then act as a heat sink or buffer between cells C1 and C3 whereby distributing the heat that may otherwise build up in the battery 12 during the discharge cycle.

In such an arrangement the balancing controller 18 may discharge a first group of cells C1, C2, C3, C4, C5 according to their arrangement or location within the battery 12 for a period of time or until each of the cells C1, C2, C3, C4, C5 being discharged has reached a predefined charge level or voltage potential, and then subsequently discharge a second, different, group of cells C1, C2, C3, C4, C5 for a second period of time or until a predefined charge level is reached.

The balancing controller 18 may then initiate discharge of a third or subsequent group of cells or may revert to discharging the first group for a further period of time, or until a second charge level or voltage potential is reached (the second charge level or voltage potential being lower than the first). The balancing controller 18 may then cycle between the two or use different groups of cells C1, C2, C3, C4, C5 until reaching a predefined charge level, (which charge level is below a threshold value) or until the cells C1, C2, C3, C4, C5 are fully depleted of electric charge.

In yet another embodiment the balancing controller 18 may prioritise discharge of certain cells C1, C2, C3, C4, C5 based upon the physical location of the cells C1, C2, C3, C4, C5 with the battery 12. For example, those cells C1, C2, C3, C4, C5 disposed around the periphery of the battery housing may be discharged before those which are centrally located. In an alternative embodiment priority may be given to discharging particular cells C1, C2, C3, C4, C5 based upon vehicle design and/or parameters of the crash or flood such that those cells C1, C2, C3, C4, C5 most likely to have been damaged in the crash or flood event are discharged with the highest priority.

In some embodiments the battery 12 includes an integrity sensor capable of detecting damage to the battery 12 or to individual cell C1, C2, C3, C4, C5, for example the integrity sensor may monitor electrolyte levels within the battery 12 and/or within one or more of individual cells C1, C2, C3, C4, C5. Priority may be given to discharging those cells which have been damaged, and/or to certain cells C1, C2, C3, C4, C5 for example cells disposed lowermost within the battery housing, which may be compromised as a consequence of the damage sustained to other cells.

In some embodiments it is envisaged that the battery 12 comprises an indicator, such as an LED or liquid crystal display to indicate that the battery management system 19 has initiated a battery discharge cycle or that a battery discharge cycle is in progress. In some embodiments the indicator may display the remaining electrical charge in or voltage of the battery and/or an estimated time to completion of the battery discharge cycle to the predefined charge value.

In an embodiment of the invention the battery discharge cycle may be triggered manually, for example by inserting or removing a trigger or other mechanical device into or from the battery 12 for example the blade of a vehicle key.

It is envisaged that the battery discharge cycle could be terminated upon demand by a user to prevent further battery discharge for example by interacting with an interface provided upon the battery.

In some embodiments the battery 12 may be provided with a "service plug" or "service disconnect". The "service plug" or "service disconnect" can be engaged or disengaged to divide the stack of cells of the battery into two or more electrically isolated portions. With the "service plug" removed or inserted, the exposed terminals T1, T2 of the battery present no high potential electrical danger to service technicians. In such embodiments it is envisaged that the battery 12 is arranged such that the battery management system 19 is still operable, for example by drawing electrical power from only one of the electrically isolated portions or is provided with a backup power supply such as a separate battery.

It can be appreciated that various changes may be made within the scope of the present invention, for example, in other embodiments of the invention it is envisaged that an active battery balancer may be employed, either in addition to or alternatively to a battery regulator to transfer charge between individual cells C1, C2, C3, C4, C5, so as to discharge the battery 12.

While reference has been made above to the or each group comprising a plurality of cells, it is to be understood that a group may instead comprise only a single cell and that the battery may comprise a plurality of groups each consisting of a different number of cells.

The invention claimed is:

1. A method of discharging a battery of a vehicle, the battery having a plurality of cells each adapted to store a charge, the method comprising:
   detecting a vehicle event based on an indication from one or more sensors, and in response;
   discharging the battery utilizing a battery management system until an electrical characteristic of the battery attains a predefined threshold value; and
   using the battery management system to balance the electric charge of each of the cells,
   wherein the battery management system is arranged to control discharge of a first group of the plurality of cells substantially independently of at least a second group of the plurality of cells, wherein the or each group of the plurality of cells comprises one or more cells.

2. The method of claim 1, wherein the battery management system is adapted to control a plurality of switches to selectively discharge the first group of the plurality of cells independently of the second group of the plurality of cells.

3. The method of claim 1, wherein the electrical characteristic is one of
   an electrical charge stored in or by said one or more cells, or
   a voltage or potential difference across the battery.

4. The method of claim 1, comprising prioritizing discharge of one or more cells based upon predefined criteria.

5. The method of claim 4, wherein the predefined criteria is one or more of the following:
   a physical location of the one or more cells within the housing of the battery;
   a detection of damage to the one more cells; or
   a vehicle design.

6. The method of claim 1 comprising isolating terminals of the battery from the plurality of cells.

7. The method of claim 1, wherein the vehicle event comprises at least one of:
   a crash of the vehicle; or
   a flooding of the vehicle; or
   a servicing or maintenance activity on the vehicle; or
   a failure of electric isolation or insulation systems of the vehicle.

8. The method of claim 1, comprising controlling the discharge of the first group of cells to prevent a temperature of the battery from reaching a threshold level.

9. A system for discharging electric charge of a battery of a vehicle, the battery having a plurality of cells each adapted to store electric charge, the system comprising:
   a controller for balancing the electric charge of each of the cells; and
   a sensor for detecting a vehicle event, wherein the controller, upon receiving a signal indicative that the vehicle event has occurred, is configured to initiate a discharge cycle of the electrical charge stored in one or more of the cells of the battery using at least one energy dissipation device, wherein the controller is adapted to control discharge of a first group of the plurality of cells independently of at least a second group of the plurality of cells, wherein the first group of the plurality of cells comprises one or more cells.

10. The system of claim 9, wherein the at least one energy dissipation device comprises a passive battery regulator or an active battery balancer.

11. The system of claim 9, wherein the battery is a traction battery for providing power to an electrically powered drive motor for vehicle propulsion.

12. The system of claim 9, wherein the vehicle event is a vehicle crash and the sensor is a crash sensor for measuring deceleration of the vehicle or detecting a collision impact.

13. The system of claim 9, wherein the vehicle event is a flooding of the vehicle and the sensor is a water sensor for detecting the presence of water.

14. The system of claim 9, wherein the vehicle event is a servicing event and the sensor comprises a switch that is operable during the servicing event.

15. The system of claim 9, comprising an isolator for electrically disconnecting terminals of the battery from the plurality of cells.

16. A vehicle comprising the system of claim 9.

17. A battery system comprising:
   a battery having a plurality of cells that are each adapted to store electric charge;
   a controller for balancing the electric charge of each of the cells; and
   a sensor for detecting a vehicle event;
   wherein the controller, upon determining that the vehicle event has occurred based on an indication from the sensor, is configured to initiate a discharge cycle of the electrical charge stored in one or more of the cells of the battery using at least one energy dissipation device, wherein the controller is adapted to control discharge of a first group of the plurality of cells independently of at least a second group of the plurality of cells, wherein the first group of the plurality of cells comprises one or more cells.

18. A method of discharging a vehicle battery having a plurality of cells each adapted to store charge, the method utilising a battery management system arranged to balance the electric charge of each of the cells, the method comprising:
   detecting a crash event via one or more sensors, and in response;
   discharging one or more cells of the vehicle battery utilising the battery management system until an electrical characteristic of the battery attains a predefined threshold value.

19. A system, comprising:
   a controller for balancing the electric charge of each of a plurality of cells of a vehicle battery; and
   a sensor for detecting a crash event;
   wherein the controller, upon receiving an indication that a crash event has occurred, is configured to initiate a discharge cycle of the electrical charge stored in one or more of the cells of the battery via an energy dissipation device until an electrical characteristic of the battery attains a predefined threshold value.

20. A vehicle comprising the system of claim 19.

21. A battery system comprising:
a battery having a plurality of cells adapted to store electrical charge;
a controller for balancing the electric charge of each of the plurality of cells of the battery; and
a sensor for detecting a crash event;
   wherein the controller, upon receiving an indication that a crash event has occurred, is configured to initiate a discharge cycle of the electrical charge stored in one or more of the cells of the battery via an energy dissipation device until an electrical characteristic of the battery attains a predefined threshold value.

* * * * *